Dec. 23, 1958   C. E. ZWEIDINGER ET AL   2,865,249
PORTABLE PICTURE SLIDE PROJECTING SYSTEM
Filed May 10, 1955   2 Sheets-Sheet 2
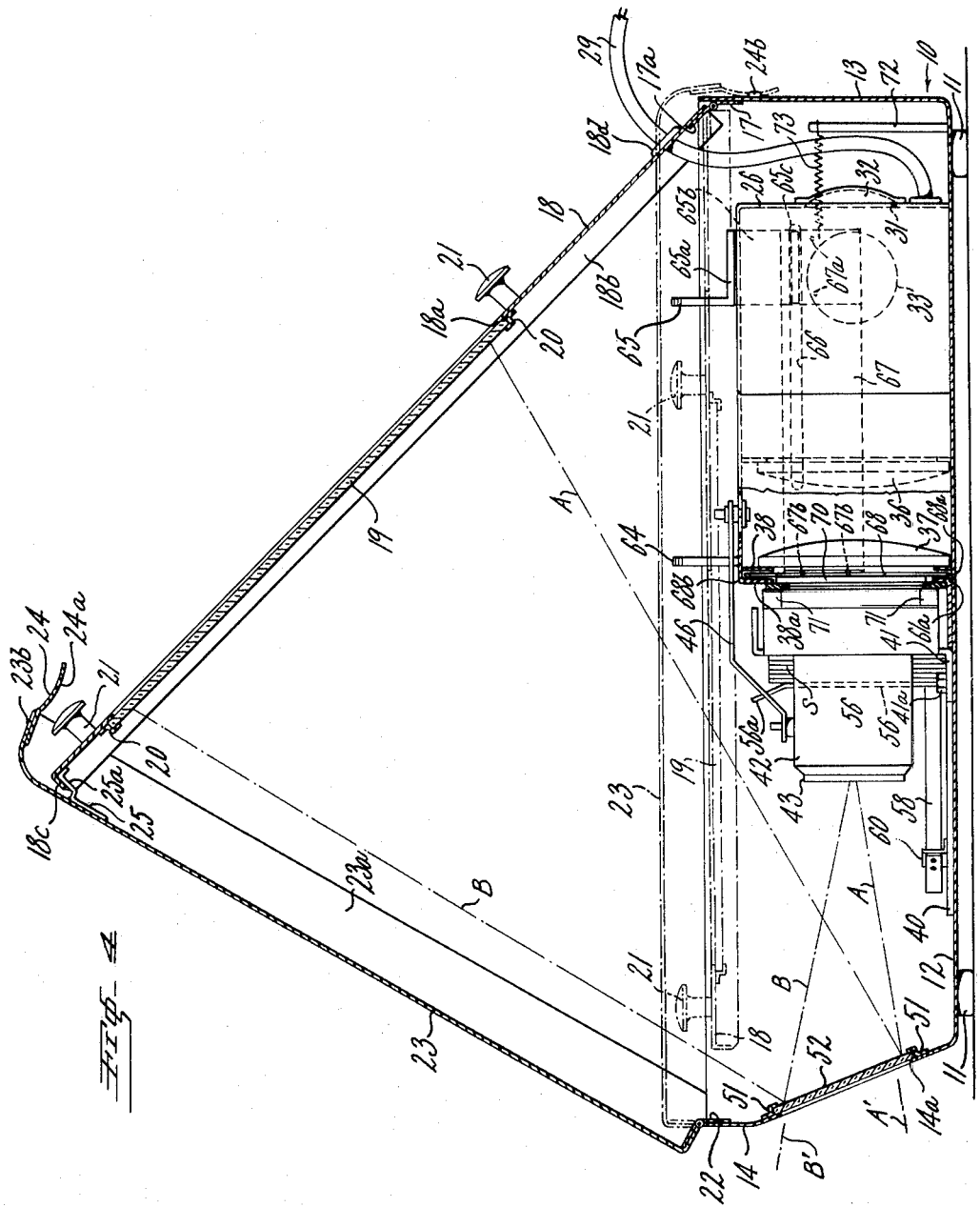
INVENTORS
CARL E. ZWEIDINGER
ERICH ROSENTHAL
BY
Leon M. Strauss
AGT

United States Patent Office

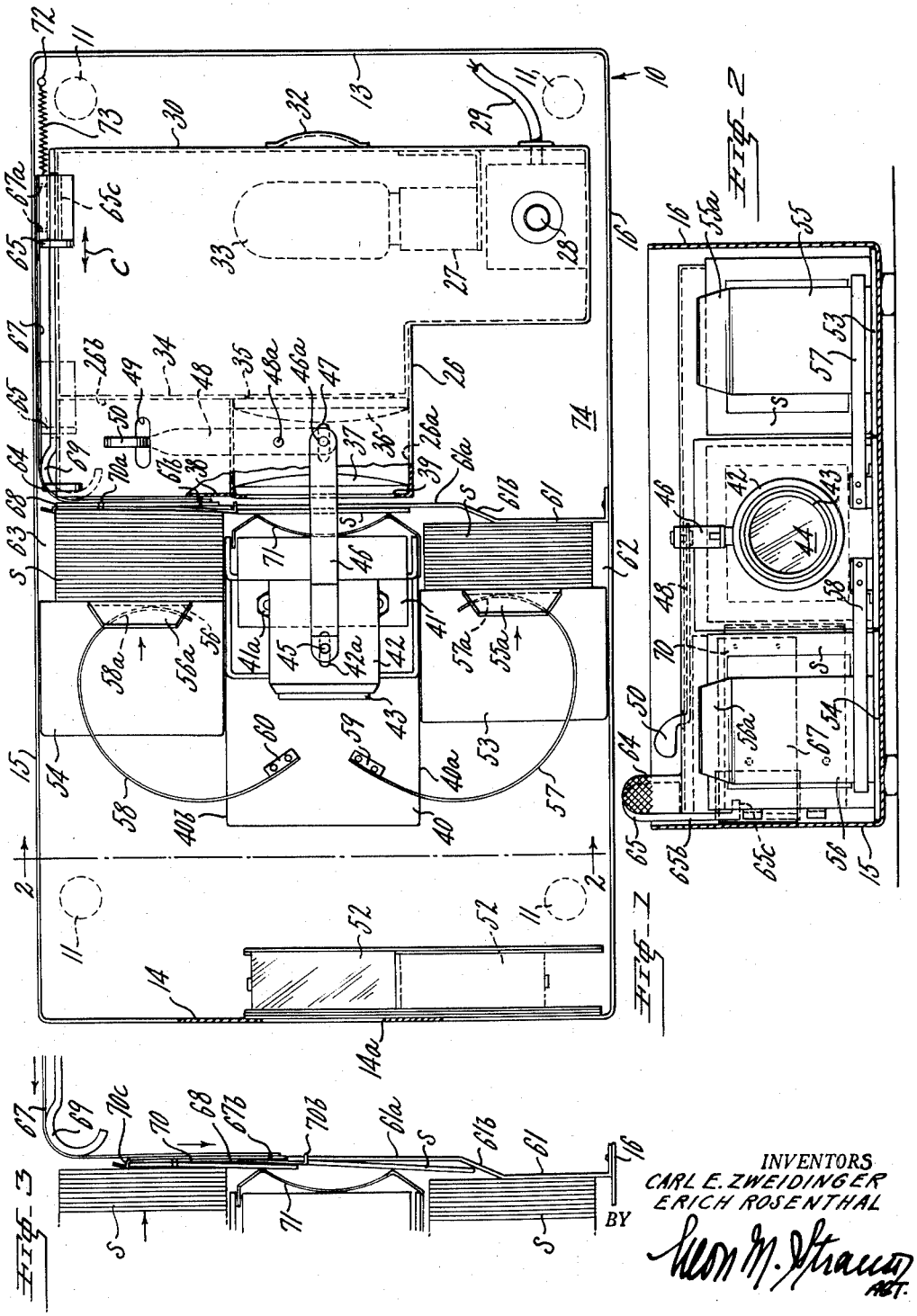

2,865,249
PORTABLE PICTURE SLIDE PROJECTING SYSTEM

Carl E. Zweidinger and Erich Rosenthal, New York, N. Y., assignors to Camera-Optics Manufacturing Corp., New York, N. Y., a corporation of New York Application May 10, 1955, Serial No. 507,265

2 Claims. (Cl. 88—28)

This invention relates to projecting systems for picture slides of any suitable structure.

It is one of the primary objects of the present invention to provide means affording the disposition of all principal components of a picture reproducing system, namely, projector means, picture screen and picture slides in conjunction with a feed mechanism for the picture slides in such a manner that said components, when not in use, are self-contained in a carrying case of relatively small dimensions, and further means facilitating easy and ready positioning of said components during use.

It is another object of the present invention to provide means ensuring substantially one-handed feed of one picture slide from a supply space to projector means and simultaneous release of a previously viewed slide from said projector means to a take-up space for storage purposes, as well as permitting focal adjustment of said projector means with the same hand, thereby enabling an operator to perform a maximum number of manipulations with a minimum of effort.

Yet a further object of the present invention resides in the provision of means contributing to a reduced number and easy accessibility of the aforesaid components in a picture projecting system of the above described kind.

It is still another object of the present invention to provide means conducive to a light-weight, self-contained projecting system or structure for picture slides which is sturdy, yet pleasing in configuration, is conveniently portable, and may be easily operated even by unskilled persons.

Still a further object of the invention is to provide means redounding to a simplified and very efficacious projection system, which may be selectively employed for reproducing or projecting pictures from slides either on a built-in screen or on a screen of any suitable size located outside said apparatus.

These and other objects of the invention will become further apparent from the following detailed description, reference being made to the accompanying drawings showing a preferred embodiment of the invention.

In the drawings:

Fig. 1 is a top plan view of the picture slide viewing means mounted in a casing or carrying case in accordance with the present invention, the lid of the casing and the screen of the viewing means being omitted;

Fig. 2 is a sectional view taken along line 2—2 in Fig. 1;

Fig. 3 is a detail view of the slide feeding mechanism shown in Fig. 1 and illustrates said mechanism in an intermediate operating position; and Fig. 4 is a partially sectional, side elevational view of the carrying case and viewing means of Fig. 1, certain parts being omitted.

Referring now more particularly to the drawings, the slide viewing system of the present invention is disposed in a casing 10 supported on small feet 11 made of rubber or other suitable materials. The casing 10 has a bottom wall 12, a front wall 13, a rear wall 14, side walls 15 and 16 and an open top.

Attached to the interior surface of front wall 13 adjacent the upper end thereof is a hinge 17, to the movable portion 17a of which there is connected a viewing panel 18. In the upper central portion of said panel 18 there is provided an opening 18a which is closed by a ground glass viewing screen 19 retained on the viewing panel by suitable brackets 20. When in inoperative position, the panel 18 substantially covers or obturates the open top of casing 10.

The viewing panel 18 is substantially channel-shaped, having downwardly depending side walls 18b (only one of which can be seen in Fig. 4) and a downwardly depending rear wall 18c. A number of anchor studs 21, for example three, are located on the upper surface of viewing panel 18, and an opening 18d is provided in viewing panel 18 adjacent the front or pivoted end thereof. The function of studs 21 and opening 18d will become more evident hereinafter.

Pivotally mounted at the top of rear wall 14, as by a hinge 22, is a channel-shaped lid or outer cover plate 23 having downwardly depending side walls 23a (only one of which is shown in Fig. 4) and a downwardly depending front wall 23b. Affixed to front wall 23b and extending downwardly therefrom is a snap 24 having a central opening 24a adapted to engage a similarly shaped catch member 24b attached to the outer surface of front wall 13 of casing 10.

Rigidly attached to the interior surface of cover plate 23 is an angle bracket 25 having a portion 25a spaced from said interior surface of cover plate 23. As may be seen from Fig. 4 (see the dotted lines), when the viewing apparatus is not in use, as during transport from place to place, lid 23 overlies panel 18 and completely closes casing 10. However, when picture slides are to be viewed, snap 24 is disconnected from catch member 24b, lid 23 and then viewing panel 18 are pivoted upwardly, and the front wall 18c of panel 18 is fitted over and behind bracket portion 25a on lid 23, whereby said bracket portion forms a prop or support for the viewing panel.

The optical system by means of which the light is projected onto screen 19 is, as indicated above, disposed entirely within the casing 10. Fixedly positioned in casing 10 adjacent the front end thereof is an L-shaped housing 26 in the narrower part of which are provided a lamp socket 27, a press-button switch 28, and an electric cord or cable 29 having a plug (not shown) at its free end for connection to a conventional electric outlet or socket (not shown) of the standard 110–120 volt (A. C. or D. C.) line to be found in almost any building.

Formed in and substantially centrally of the front wall 30 of housing 26 is an opening 31 (see Fig. 4) which is covered by a reflector 32 of any suitable type. A lamp 33 is fitted into socket 27 and extends to a location adjacent the optical face of the reflector 32, whereby the latter can collimate the light emitted by the lamp 33 into a substantially parallel-ray beam directed longitudinally and toward the rear of casing 10.

A partition 34 traverses housing 26 rearwardly of the lamp 33 and is formed with an aperture or opening 35 co-axially aligned with opening 31 in the front wall 30 of said housing. A light condenser, consisting of lenses 36 and 37, is disposed in a compartment 26a located between the partition 34 and the rear wall 38 of the housing 26, said rear wall 38 presenting an aperture or opening 39 axially aligned with lenses 36, 37, apertures 35 and 31, and reflector 32.

A base plate 40 is fixedly attached to the bottom wall 12 of the casing 10 substantially centrally thereof. A bracket 41 is mounted on said base plate 40 adjacent the front end thereof by means of bolts 41a and supports a focusing device consisting of an outer cylindrical sleeve 42 and an inner cylindrical lens sleeve 43, in the latter of which the required lenses 44 are disposed. Lens sleeve 43 is longitudinally slidable within outer sleeve 42 for the purpose of focus adjustment.

To effect adjustment of lens sleeve 43, outer sleeve 42 is provided with a longitudinal slot 42a in its upper surface in which a pin 45, the bottom end of which is attached to the upper surface of lens sleeve 43, rides. Attached to the upper end of pin 45 and extending therefrom forwardly toward housing 26 is a focusing lever 46 carrying a downwardly projecting pin 46a at its front end. Pin 46a extends through a longitudinal slot 47 provided in the upper surface of compartment 26a of housing 26 for reciprocatory longitudinal movement therein.

Pivotally connected to pin 46a at the lower end thereof is an actuating lever 48 pivoted at 48a in compartment 26a and extending from the latter into a compartment 26b. The upper wall of compartment 26b is formed with a slot 49 through which projects a handle or finger grip 50 for the lever 48. Thus it will be seen that finger pressure applied laterally to grip or handle 50 will reciprocate lens sleeve 43 within outer sleeve 42 to adjust the focus of light emanating from lamp 33.

Rear wall 14 of casing 10, which is inclined at an angle to the vertical over a portion of its height, is provided with a central rectangular opening 14a. Rigidly attached to the inner surface of rear wall 14 are two angle brackets 51 which extend parallel to each other and to the upper and lower sides of opening 14a and provide a slideway for a mirror 52. The mirror 52 may be shifted within the casing 10 along the slideway defined by brackets 51 so that in one position (shown in full lines in Fig. 1) it covers opening 14a while in another position (shown in broken lines in Fig. 1) it leaves opening 14a uncovered.

From the above it will be readily realized that when mirror 52 closes opening 14a, the light emerging from lenses 44 and diagrammatically represented by broken lines A and B will be reflected from mirror 52 onto the ground glass viewing screen 19 supported in viewing panel 18. However, when mirror 52 is positioned to leave opening 14a uncovered, then the light from lenses 44 will be transmitted through opening 14a along a path represented diagrammatically by the broken lines A' and B' until it encounters a suitable viewing screen (not shown) located outside and rearwardly of casing 10.

The slide retaining and feeding system which, as indicated hereinabove, is also completely disposed within casing 10 includes a pair of sliding plates 53 and 54 which are located on the bottom wall 12 of casing 10 rearwardly of housing 26. Plates 53 and 54 may slide back and forth along bottom wall 12 and are constrained to linear reciprocatory movements by respective guide edges constituted by side walls 15 and 16 of casing 10 and side edges 40a and 40b of fixed base plate 40.

Plates 53 and 54 are provided, respectively, with upstanding wall members 55 and 56 located at the front edges of said plates for a purpose to be more fully described hereinbelow. The upper ends 55a and 56a of wall members 55 and 56, respectively, are inclined toward the rear edges of said plates to provide a gripping surface for a finger of the operator of the slide viewing apparatus.

Two leaf springs 57 and 58, each of which has one of its ends anchored to base plate 40, as by brackets 59 and 60, have their free ends 57a and 58a bearing against wall members 55 and 56, respectively, to urge the latter toward the front end of casing 10. Fixedly attached to the side wall 16 of the casing 10 is a partition member 61 which is located between housing 26 and sliding plate 53. Thus it may be seen that the forward movements of plates 53 and 54 are limited, respectively, by the partition member 61 and the rear wall 38 of housing 26.

The spaces 62 and 63, which can, by virtue of the above described structure, be created between sliding plate 53 and partition member 61 and between sliding plate 54 and rear wall 38 of housing 26, respectively, serve as storage chambers for the slides S to be viewed on screen 19. In the disclosed embodiment of the invention, the picture slides S are taken from space 63, shifted into operative position between lamp 33 and lenses 44, and after being viewed are shifted into space 62 by a feeding mechanism to be presently described.

Protruding from the top wall of housing 26 is a stationary finger piece 64 which is knurled to provide a good gripping surface. A second finger piece 65, which may also be knurled, is slidably mounted on housing 26 forwardly of said stationary finger piece 64 for reciprocatory movement along housing 26 in the directions of the double-headed arrow C.

Finger piece 65 is provided with a horizontal portion 65a which engages and rides on the upper wall of housing 26 and to which is connected a downwardly depending plate-like portion 65b movable therewith along and parallel to the side wall 15 of the casing 10. In order to prevent inadvertent vertical displacement of finger piece 65, there is provided adjacent the lower end of plate-like portion 65b a tongue or key 65c which fits slidingly into a groove 66 formed on the adjacent side wall of housing 26.

Fixed to the side of plate-like portion 65b facing away from housing 26, as by means of small rivets or other fasteners 67a, is a relatively strong but flexible tape 67 which extends rearwardly from plate-like portion 65b and is movable therewith. The other end of tape 67 is connected by small rivets or other fasteners 67b to a flat plate 68 movable transversely of casing 10 parallel to the rear wall 38 of housing 26.

As may be seen from Fig. 4, the lower edge of plate 68 is guided in a channel 68a formed between the rear wall 38 of housing 26 and a vertical flange-like extension 61a of partition member 61, while the upper edge of plate 68 is guided in a channel 68b formed between the rear wall 38 of housing 26 and a flange-like projection 38a attached to said housing. An arcuate guide member 69 is mounted on housing 26 slightly beneath the stationary finger piece 64 and provides a guide surface for the tape 67 in its movements with the movable finger piece 65.

A slide shifter 70 is fixedly connected to the rearwardly facing side of carrier plate 68 by small rivets or other fasteners 70a. The slide shifter 70 consists of an elongated, slightly resilient, central strip or plate body of a suitable substance, e. g., metal, and is provided at one end with a first shifting element 70b and its other end with a second shifting element 70c.

As may be most clearly seen from Figs. 1 and 3, element 70b is a flange extending at right angles to the plane of the body of slide shifter 70, while element 70c consists of a similar flange extending rearwardly from said body and provided with a further flange extending substantially at right angles to the first-mentioned flange of element 70c.

A spring 71 is interposed between the forward end of the bracket 41 supporting the lens assembly and the adjacent rear wall 38 of housing 26. Spring 71 serves to bias any slide being viewed against flanges 38a and 61a to prevent movement of such slide longitudinally of the casing 10.

A rod or post 72 is stationarily mounted on the bottom wall 12 of the casing 10 adjacent the front end of the latter. This rod 72 provides an anchoring location for one end of a tension spring 73, the other end of which is anchored to plate member 65b depending from finger piece 65. Thus, spring 73 biases finger piece 65 toward and tends to retain it in its forwardmost position on housing 26, as shown in solid lines in Figs. 1 and 4.

The operation of the slide viewing apparatus according to the invention is as follows:

After lid 22 and viewing panel 18 have been pivoted away from their closed or inoperative positions (as shown in dotted lines in Fig. 4) and rear wall 18c of the viewing panel 18 has been hooked over bracket portion 25a, the cord 29, which extends through opening 18d in the panel, is unwound from anchor studs 21 and the electric plug (not shown) connected to any convenient power outlet. Wall portion 56 of sliding plate 54 is now gripped at 56a and moved rearwardly of casing 10 against the force of spring 58 and a group of slides S to be viewed is then placed into space 63 created by the aforesaid rearward movement of sliding plate 54.

The slides S, which, of course, must be located in side by side relation with the pictures inverted whenever mirror 52 is used, are so successively aligned in space 63 that one edge, i. e., the trailing edge of the forwardmost slide (see Fig. 1, for example) fits into the corner formed by the body of slide shifter 70 and the first flange of shifting element 70c. Spring 58 presses wall member 56 against the rearwardmost slide and thus tends to maintain all the slides in surface contact with each other as well as to maintain the upper and lower edges of the forwardmost slide in contact with flanges 38a and 61a, respectively.

The screen 19 is now illuminated by manipulation of switch 28 so as to cause lighting of the lamp 33. This results in transmission of a beam of light from reflector 32 through the condenser lenses 36, 37 and lens system 44 to the mirror 52, the light being reflected from said mirror onto screen 19. If desired, suitable means, such as louvers (not shown), may be incorporated in the top wall of housing 26 to permit air heated by lamp 33 to escape, thus preventing injury to the slides due to overheating.

Finger pieces or manipulating means 64 and 65 are now gripped, say, by the middle finger and thumb, respectively, and pressure is applied to finger piece or actuating member 65 to move the latter toward finger piece 64 to the position shown in dotted lines in Fig. 1. Such movement of finger piece 65 pushes flexible means, such as tape 67 ahead of it and around guide 69 and thus causes plate 68 and the slide shifter 70 attached thereto to be moved transversely of the casing 10.

As the slide shifter 70 is moved, the slide S engaged by shifting element 70c is moved with it, the lengths of the tape 67 and of the path of movement of finger piece 65 being so determined that when finger piece 65 arrives in its dotted line position (see Fig. 1) the slide is directly aligned with the path of the beam of light from the reflector 32. At this time, plate 68 blocks the path of the light beam.

The pressure on finger piece 65 is now removed to permit spring 73 to retract said finger piece and the tape 67 and, consequently, plate 68 and slide shifter 70 therewith, leaving the slide S in its position intersecting the light beam. During this retracting movement, the resilient body of shifter 70 is forced flush against plate 68 by said slide under the force of spring 71.

The picture can then be view on the screen and brought into clear focus by manipulation of handle 50 of the actuating lever 48 of the focusing mechanism, say, by the index finger of the operator. Thus it will be seen that both the slide feeding operation and the focusing operation may be performed with one hand and even simultaneously by different fingers of one and the same hand.

As soon as finger piece 65 and slide shifter 70 arrive at their respective starting positions, shifting element 70b is withdrawn past the trailing edge of the slide S being viewed, and the inherent resilience or pretensioning of the body of the shifter 70 then causes said element 70b to be moved away from plate 68 again (see Fig. 1) until the leading or outer surface or element 70b contacts the trailing edge of the slide S being viewed. At the same time another slide will now have been pushed forwardly by spring 58 and wall member 56 so that the trailing edge of this other slide is engaged by shifting element 70c.

To shift this other slide into viewing position finger pieces 64 and 65 are again gripped and the latter moved against the force of spring 73 toward finger piece 64. This causes the slide shifter 70 to be moved transversely of the casing 10 and to drag with it said other slide by means of shifting element 70c. Concurrently, the shifting element 70b pushes the originally viewed slide ahead of it past the angled surface 61b of partition member 61 and thus forces it in between said partition member and wall member 55, where the slide is then stored.

As these operations are repeated over and over again, each time a slide already viewed is forced by shifting element 70b into the space 62 now formed between partition member 61 and wall member 55 of sliding plate 53, while another as yet unviewed slide is moved into viewing position by the shifting element 70c of the slide shifter 70.

As soon as all the slides have been viewed wall member 55 is gripped at 55a and plate 53 moved rearwardly thereby against the force of spring 57. The stored slides S can then be removed from space 62 to be placed into any suitable container therefor.

In the event that the number of slides to be viewed is so great as to make simultaneous retention thereof either in space 63 or subsequently in space 62 unfeasible, then some of the slides either before or after being viewed may be temporarily placed into the space 74 formed between partition member 61 and the elbow portion of housing 26.

In case it is desired to project the images of the picture slides onto another screen located externally of the casing 10, it is merely necessary to shift mirror 52 from its solid line position to its dotted line position shown in Fig. 1 in which case the light from lamp 33 can pass through opening 14a of end wall 14 of the casing. The slide shifting operation, however, is exactly the same as before. Should this arrangement be used, then the slides must, of course, be set into space 63 right side up and not inverted.

After all the slides have been viewed, the light is turned off by switch 28, the cord disconnected from the power outlet and rewound around anchor studs 21, and panel 18 lifted slightly to disengage the latter from bracket portion 25a. The panel with the screen is then pivoted downwardly into casing 10, after which lid 23 is lowered until snap 24 engages catch member 24b to close the casing. The up and down movements of the lid 23 and the panel 18 thus occur in a plane substantially perpendicular to the plane of the casing.

The apparatus as a whole weighs very little and is sufficiently small to be easily carried about by hand without any discomfort. Moreover, in view of its relatively small dimensions, the casing during use can be supported on a correspondingly small surface, thus eliminating the need for a large and heavy table or support.

In retrospect, therefore, there has been provided in accordance with a broad aspect of the present invention, a projecting system for picture slides comprising a casing, projector means accommodated in said casing, feeding means actuatable for transporting said picture slides successively to and subsequently from said projector means within said casing, screen means arranged for movement relative to said casing to operative and inoperative positions, said screens means forming a cover for said casing in said inoperative position, means in said casing transmitting images from said projector means onto said screen means, and lid means for closing said casing and overlying said screen means in said inoperative position.

Various changes and modifications may be made without departing from the spirit and scope of the present

Having thus described the invention, what is claimed as new and desired to be secured by Letters Patent, is:

1. An apparatus having an optical system including a light source for successively projecting picture slides; comprising a first storage chamber, a second storage chamber, said storage chambers being, respectively, arranged at either side of said optical system, an elongated casing accommodating both said chambers and said system, said casing having a slotted guide along one side thereof, manipulating means extending lengthwise of said casing therewithin and including a flexible metal tape slidable lengthwise of said casing parallel to the axis of said optical system, a fixed finger piece on said casing, a movable finger piece on said tape cooperating with said fixed finger piece and having a portion thereof extending through said slotted guide, an imperforate slide shifting plate arranged for movement in transverse direction to said manipulating means and normally positioned adjacent one end of said first chamber, said shifting plate including a first shifting flange extending substantially normal to said shifting plate and being arranged to receive a slide from said first chamber for movement from an extreme position in said first chamber towards said optical system with said shifting plate being disposed between the slide and said light source when said shifting plate has moved toward said optical system, a second shifting flange forming part of said shifting plate and extending oppositely with respect to said first shifting flange for engaging a slide after the same has been transferred from said first chamber into the path of said optical system, said tape being anchored on and extending from said shifting plate to said movable finger piece for operation thereby, an arcuate guide member on said casing for guiding said tape during the course when said movable finger piece is moved lengthwise of said casing to move a portion of said tape and said shifting plate transverse to said casing, spring means in said casing for maintaining a slide in position when supplied through said shifting plate to said optical system, deviating wall means in said casing and arranged rearwardly of said second chamber and adapted to direct the respective slide from said optical system into said second chamber, and means registering a further slide from said first chamber with said first shifting flange of said slide shifting plate upon return of said shifting plate to said extreme position.

2. An apparatus having an optical system including a light source for successively projecting picture slides; comprising a first variable size storage chamber from which slides are supplied, a second variable size storage chamber to which picture slides are discharged, said storage chambers being, respectively, arranged at either side of said optical system, an elongated casing accommodating both said chambers and said optical system, spring pressed sliding plates disposed on opposite sides of said optical system and forming parts of said first and second storage chambers, said casing having a slotted guide along one side thereof, manipulating means extending lengthwise of said casing therewithin and including a flexible metal tape slidable lengthwise of said casing parallel to the axis of said optical system, a fixed finger piece on said casing, a movable finger piece on said tape cooperating with said fixed finger piece and having a portion thereof extending through said slotted guide, an imperforate slide shifting plate arranged for movement in transverse direction to said manipulating means and normally positioned adjacent one end of said first chamber, said shifting plate including a first shifting flange extending substantially normal to said shifting plate and being arranged to receive a slide from said first chamber for movement from an extreme position in said first chamber towards said optical system with said shifting plate being disposed between the slide and said light source when said shifting plate has moved toward said optical system, a second shifting flange forming part of said shifting plate and extending oppositely with respect to said first shifting flange for engaging a slide after the same has been transferred from said first chamber into the path of said optical system, said tape being anchored on and extending from said shifting plate to said movable finger piece for operation thereby, an arcuate guide member on said casing for guiding said tape during the course when said movable finger piece is moved lengthwise of said casing to move a portion of said tape and said shifting plate transverse to said casing, spring means in said casing for maintaining a slide in position when supplied through said shifting plate to said optical system, deviating wall means in said casing and arranged rearwardly of said second chamber and adapted to direct the respective slide from said optical system into said second chamber, and means registering a further slide from said first chamber with said first shifting flange of said slide shifting plate upon return of said shifting plate to said extreme position.

References Cited in the file of this patent

UNITED STATES PATENTS

| | | |
|---|---|---|
| 2,213,779 | Young | Sept. 3, 1940 |
| 2,299,657 | Rystedt | Oct. 20, 1942 |
| 2,476,797 | Bennett et al. | July 19, 1949 |
| 2,485,709 | Davock | Oct. 25, 1949 |
| 2,634,653 | Barth | Apr. 14, 1953 |

FOREIGN PATENTS

| | | |
|---|---|---|
| 408,237 | France | Jan. 19, 1910 |